US010535375B2

(12) United States Patent
Iwanami

(10) Patent No.: US 10,535,375 B2
(45) Date of Patent: Jan. 14, 2020

(54) INFORMATION PROCESSING SYSTEM, INFORMATION PROCESSING METHOD, AND RECORDING MEDIUM

(71) Applicant: SONY CORPORATION, Tokyo (JP)

(72) Inventor: Hiroshi Iwanami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/745,760

(22) PCT Filed: Apr. 28, 2016

(86) PCT No.: PCT/JP2016/063466
§ 371 (c)(1),
(2) Date: Jan. 18, 2018

(87) PCT Pub. No.: WO2017/022286
PCT Pub. Date: Feb. 9, 2017

(65) Prior Publication Data
US 2018/0211693 A1 Jul. 26, 2018

(30) Foreign Application Priority Data
Aug. 3, 2015 (JP) ................. 2015-153240

(51) Int. Cl.
G11B 27/34 (2006.01)
G06K 9/00 (2006.01)
G11B 27/11 (2006.01)
(52) U.S. Cl.
CPC .......... G11B 27/34 (2013.01); G06K 9/00718 (2013.01); G11B 27/11 (2013.01)

(58) Field of Classification Search
CPC ......... H04N 5/77; H04N 5/772; H04N 9/8205
See application file for complete search history.

(56) References Cited

U.S. PATENT DOCUMENTS 9,082,018 B1 * 7/2015 Laska ................ G06K 9/00711
9,158,974 B1 * 10/2015 Laska ..................... G06T 7/246
(Continued)

FOREIGN PATENT DOCUMENTS

JP 2001-067574 A 3/2001
JP 2003-114283 A 4/2003
(Continued)

OTHER PUBLICATIONS

International Search Report and Written Opinion of PCT Application No. PCT/JP2016/063466, dated Jul. 12, 2016, 9 pages of ISRWO.

Primary Examiner — Thai Q Tran
Assistant Examiner — Sunghyoun Park
(74) Attorney, Agent, or Firm — Chip Law Group

(57) ABSTRACT

Provided is an information processing system, including a moving image data acquiring unit that acquires moving image data, a communication unit that receives sensor data associated with the moving image data and chronological data corresponding to a shooting time of the moving image data, an image signal processing unit that performs image analysis on the moving image data and generate image analysis result data, and a control unit that generates an interface including the moving image data and graphs of at least two pieces of data among the sensor data, the chronological data, and the image analysis result data.

12 Claims, 16 Drawing Sheets

(56) References Cited

U.S. PATENT DOCUMENTS

| | | | | |
|---|---|---|---|---|
| 10,049,158 B1* | 8/2018 | Goetz | ................... | H04N 21/44 |
| 2006/0074296 A1* | 4/2006 | Dumoulin | .............. | A61B 5/055 |
| | | | | 600/424 |
| 2009/0153401 A1* | 6/2009 | Eitan | ....................... | G01S 19/34 |
| | | | | 342/450 |
| 2011/0165129 A1* | 7/2011 | Kriegstein | ............. | A61K 35/30 |
| | | | | 424/93.7 |
| 2013/0335441 A1* | 12/2013 | Zalev | .................. | A61B 5/7203 |
| | | | | 345/629 |
| 2013/0336628 A1* | 12/2013 | Lamb | ...................... | H04N 9/79 |
| | | | | 386/224 |

FOREIGN PATENT DOCUMENTS

| | | |
|---|---|---|
| JP | 2004-005639 A | 1/2004 |
| JP | 2005-003563 A | 1/2005 |
| JP | 2005-080172 A | 3/2005 |
| JP | 2011-146999 A | 7/2011 |
| JP | 2013-131159 A | 7/2013 |
| JP | 2013-214985 A | 10/2013 |

* cited by examiner

INFORMATION PROCESSING SYSTEM, INFORMATION PROCESSING METHOD, AND RECORDING MEDIUM

CROSS REFERENCE TO RELATED APPLICATIONS

This application is a U.S. National Phase of International Patent Application No. PCT/JP2016/063466 filed on Apr. 28, 2016, which claims priority benefit of Japanese Patent Application No. JP 2015-153240 filed in the Japan Patent Office on Aug. 3, 2015. Each of the above-referenced applications is hereby incorporated herein by reference in its entirety.

TECHNICAL FIELD

The present disclosure relates to an information processing system, an information processing method, and a recording medium.

BACKGROUND ART

In general, video data (moving images) such as videos can consecutively record a situation at the time or a situation before and after it reaches the moment as compared with still images and is thus effective when a subject or an event is observed for a long time.

As a technique of reproducing such moving images, for example, an information processing device that sets a favorite degree based on a user input at predetermined time intervals of a moving image being recorded, displays a graph indicating a change in the set favorite degree together with the moving image, and thus can extract and reproduce a part associated with the favorite degree is disclosed in Patent Literature 1.

CITATION LIST

Patent Literature

Patent Literature 1: JP 2013-214985A

DISCLOSURE OF INVENTION

Technical Problem

However, in a case in which a desired point (scene) is searched for from a moving image having a long duration, it is required to reproduce the moving image from a first scene and observe the entire video, and thus it takes much time and effort. Further, in the technique of the related art, it is possible to detect the favorite degree set on the basis of the user input, a climax scene, or the like to extract and reproduce a desired scene, but a technique of searching for a reproduction point in association with data which is not obtained from an image analysis result for a moving image (for example, sensor data) is not mentioned.

In this regard, the present disclosure proposes an information processing system, an information processing method, and a recording medium, which are capable of assisting in a search for a moving image using a graph of data which is not obtained from image analysis associated with a moving image.

Solution to Problem

According to the present disclosure, there is provided an information processing system, including: a moving image data acquiring unit configured to acquire moving image data; a communication unit configured to receive sensor data associated with the moving image data and chronological data corresponding to a shooting time of the moving image data; an image signal processing unit configured to perform image analysis on the moving image data and generate image analysis result data; and a control unit configured to generate an interface including the moving image data and graphs of at least two pieces of data among the sensor data, the chronological data, and the image analysis result data.

According to the present disclosure, there is provided an information processing method, including: acquiring, by a processor, moving image data; receiving, by the processor, sensor data associated with the moving image data and chronological data corresponding to a shooting time of the moving image data; performing, by the processor, image analysis on the moving image data and generating image analysis result data; and generating, by the processor, an interface including the moving image data and graphs of at least two pieces of data among the sensor data, the chronological data, and the image analysis result data.

According to the present disclosure, there is provided a computer-readable recording medium having a program recorded thereon, the program causing a computer to function as: a moving image data acquiring unit configured to acquire moving image data; a communication unit configured to receive sensor data associated with the moving image data and chronological data corresponding to a shooting time of the moving image data; an image signal processing unit configured to perform image analysis on the moving image data and generate image analysis result data; and a control unit configured to generate an interface including the moving image data and graphs of at least two pieces of data among the sensor data, the chronological data, and the image analysis result data.

Advantageous Effects of Invention

As described above, according to the present disclosure, it is possible to assist in a search for a moving image using a graph of data which is not obtained from image analysis associated with a moving image.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
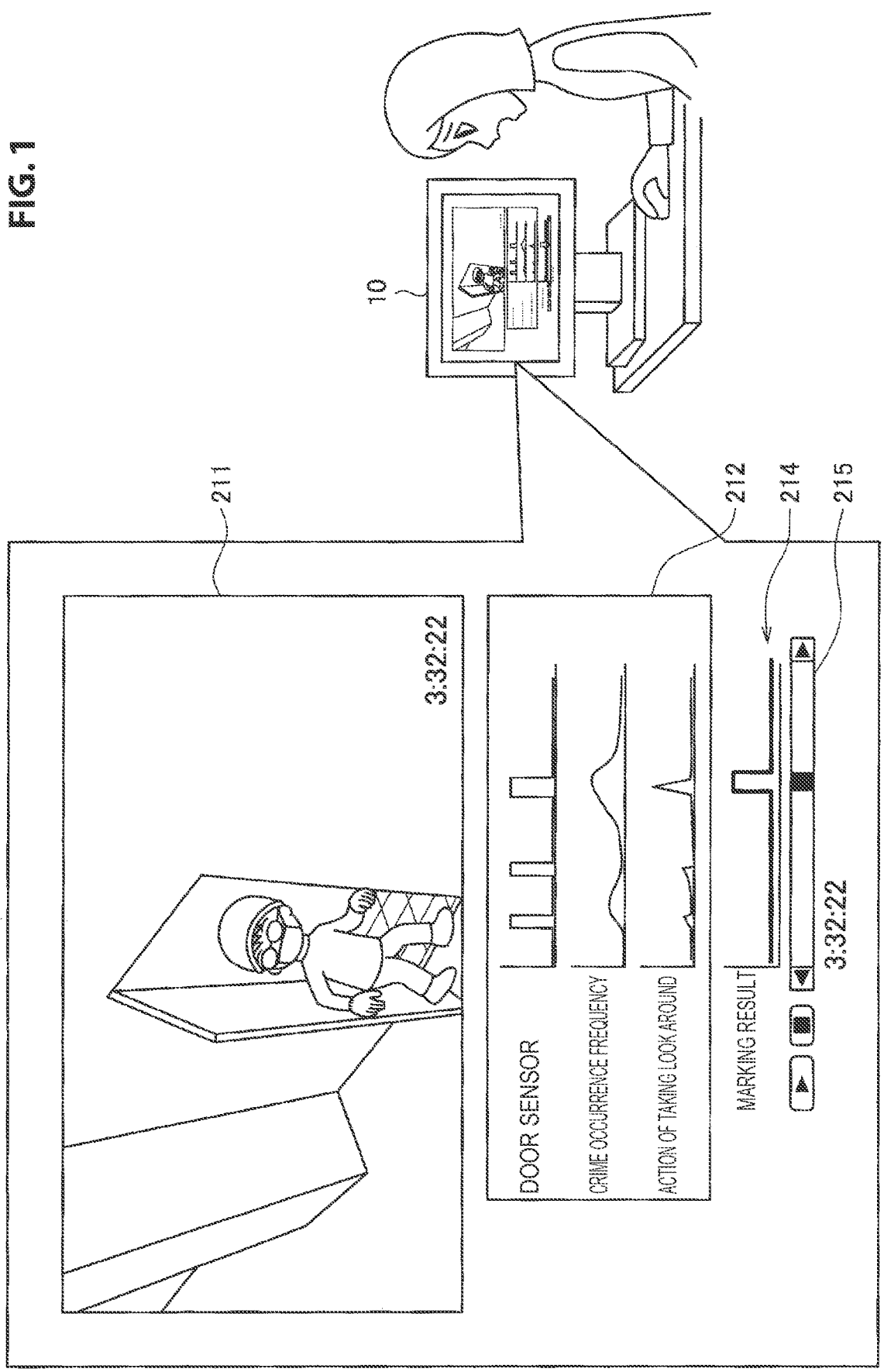
FIG. 1 is a diagram illustrating an overview of a moving image search system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Overview of moving image search system according to embodiment of present disclosure
2. Embodiments
2-1. First embodiment
(2-1-1. Configuration)
(2-1-2. Operation process)
(2-1-3. Application example)
2-2. Second embodiment
2-3. Third embodiment
3. Conclusion 1. Overview of Moving Image Search System According to Embodiment of Present Disclosure FIG. 1 is a diagram illustrating overview of a moving image search system according to an embodiment of the present disclosure. As illustrated in FIG. 1, the moving image search system according to the present embodiment is a moving image search system which is capable of assisting in a video search, for example, when the user checks a video captured by a monitoring camera (see a camera 11a illustrated in FIG. 2) using an information processing device 10.

In recent years, from a viewpoint of crime prevention, monitoring cameras have become popular even in general homes and have been installed at entrances, balconies, or the like of homes. However, there are cases in which the video of the monitoring camera has a duration of ten hours to hundreds of hours, and it is very difficult to check such a long video from the beginning to the end and find an abnormality.

In this regard, in the present embodiment, for example, when the user searches for a specific reproduction point (that is, a shooting time) such as a scene in which a burglar breaks into a home from a moving image having a long duration such as the video of the monitoring camera, a graph of data associated with a captured image (a graphic chart indicating a data change at predetermined time intervals corresponding to a shooting time) is displayed together, and the burden on the user for the video search is reduced.

More specifically, for example, as illustrated in FIG. 1, the information processing device 10 displays graphs 212 indicating the number of specific suspicious actions based on door sensor data at the time of shooting, a crime occurrence frequency data corresponding to a shooting time, and an image analysis result of moving image data 211 together with the moving image data 211. For example, the moving image data 211 is a video of the monitoring camera installed near the door. The monitoring camera (camera 11a) is able to shoot a video of a passage and the like in the vicinity of the door or in front of the door and shoot a video of people who enter or leave the passage or the door for a long time. Further, the door sensor data is data detected by a sensor that detects opening and closing of the door. For example, the crime occurrence frequency data corresponding to the shooting time is theft occurrence frequency data (of a regional unit, for example) near a shooting place corresponding to a shooting time (which may be a pattern such as a day of week, a time, or a season). The theft occurrence frequency data may be acquired from a dedicated server on the cloud. For example, the specific suspicious action based on the image analysis result is an action of taking a look around.

All time axes of the graphs correspond to the shooting time of the moving image (from a shooting start to a shooting end), and the user is able to understand a time around which an abnormality occurs easily and intuitively just by looking at the graph 212 and designate a reproduction point of the moving image.

As illustrated in FIG. 1, the information processing device 10 is able to further display a seek bar 215 used to designate an image of a desired time and a marking result bar 214 indicating a marking result based on each piece of data, which correspond to the length of the axis of each graph in the time axis direction. In the marking result bar 215, marking is performed on a time at which all pieces of data satisfy a predetermined condition. For example, the marking is performed on a time at which the door is opened and closed, the crime occurrence frequency exceeds a predetermined threshold value, and the number of actions in which a subject shown in a captured image takes a look around exceeds a predetermined threshold value. Since there is a high possibility that a suspicious person will be shown in a video of such a time, the user is able to easily check whether or not an abnormality has occurred by operating the seek bar 215 and reproducing the video of the time.

A specific configuration example and an operation process of the moving image search system according to an embodiment of the present disclosure described above will be specifically described below using a plurality of embodiments.

2. Embodiments 2-1. First Embodiment

First, a moving image search system according to a first embodiment of the present disclosure will be described with reference to FIGS. 2 to 7. The moving image search system according to the present embodiment is executed by an information processing device 10a.

Figure 2:
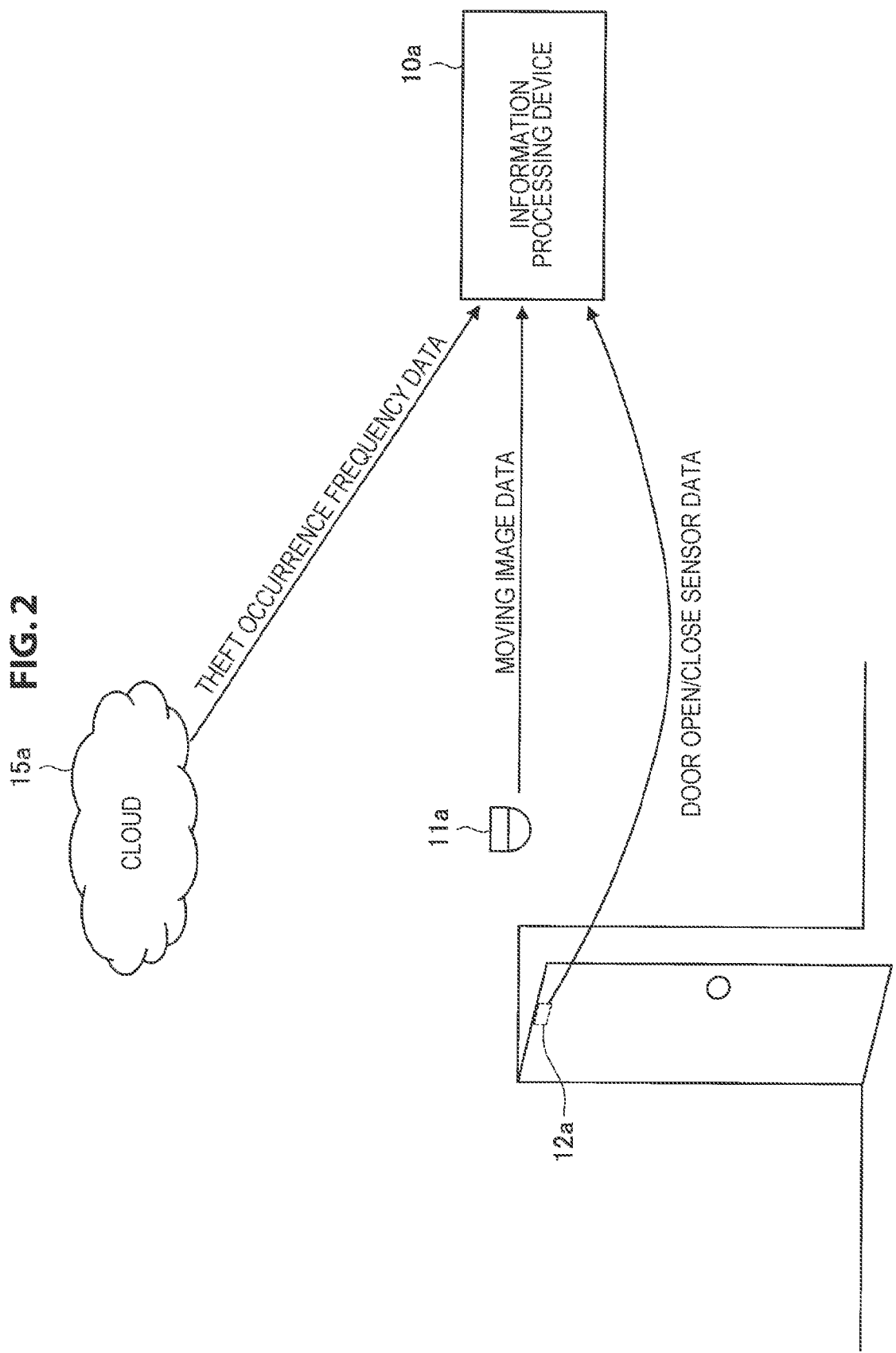
FIG. 2 is a diagram for describing an overview of a moving image search system according to a first embodiment.

FIG. 2 is a diagram for describing the overview of the moving image search system according to the first embodiment. As illustrated in FIG. 2, the information processing device 10a according to the present embodiment acquires moving image data captured by the camera 11a which images an area in the vicinity of the door, acquires door open/close sensor data detected from a sensor 12a which detects opening/closing of the door, and acquires the theft occurrence frequency data stored in a crime statistic database (DB) from a cloud 15a.

The information processing device 10a stores the moving image data captured by the camera 11a, the theft occurrence frequency data corresponding to the shooting time, the door open/close sensor data acquired at the time of shooting, and the image analysis result for the moving image data as a recording process. Further, the information processing device 10a is able to assist the user in a video search by displaying the graphs based on the theft occurrence frequency data, the door open/close sensor data, and the image analysis result together with the moving image data as a reproduction process. In other words, for example, since there is a high possibility that a moment at which a burglar breaks in will be shown in a video of a time at which the theft occurrence frequency is high, opening and closing of the door is detected, and a suspicious motion of the subject is detected according to the image analysis result, the user is able to search for a desired scene without checking all videos having a long duration. In particular, since sensor data and chronological data which are not obtained from image analysis are displayed in the graph corresponding to the time axis of the moving image data, the user is able to intuitively understand a point (that is, a time) of a desired scene on the time axis.

(2-1-1. Configuration)

Figure 3:
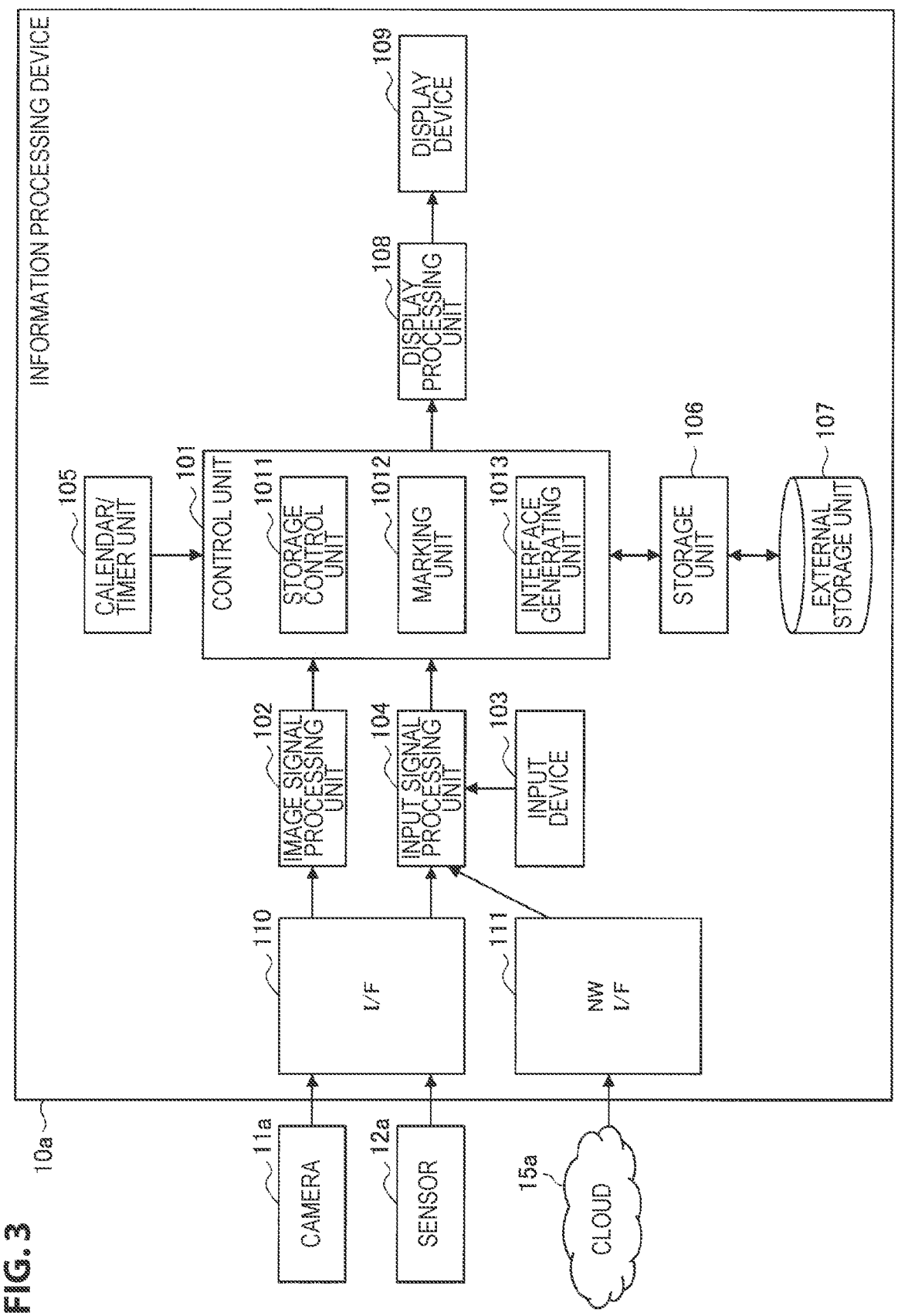
FIG. 3 is a block diagram showing a configuration example of an information processing device according to the first embodiment.

Next, a configuration of the information processing device 10a according to the first embodiment described above will be described with reference to FIG. 3. FIG. 3 is a block diagram illustrating a configuration example of the information processing device 10a according to the first embodiment.

As illustrated in FIG. 3, the information processing device 10a according to the present embodiment includes a control unit 101, an image signal processing unit 102, an input device 103, an input signal processing unit 104, a calendar/timer unit 105, a storage unit 106, an external storage unit 107, a display processing unit 108, a display device 109, an interface (I/F) 110, and a network (NW) I/F 111. Here, the information processing device 10a according to the present embodiment may be implemented by a personal computer (PC) as illustrated in FIG. 2 or may be implemented by a smartphone, a mobile phone terminal, a tablet terminal, a wearable device, a game machine, a music player, or the like.

The control unit 101 functions as an operation processing unit and a control device and controls an overall internal operation of the information processing device 10a in accordance with various kinds of programs. The control unit 101 is implemented by an electronic circuit such as a central processing unit (CPU) or a microprocessor, for example.

Further, the control unit 101 according to the present embodiment also functions as a storage control unit 1011, a marking unit 1012, and an interface generating unit 1013. The storage control unit 1011 performs control such that the moving image data captured by the camera 11a, the theft occurrence frequency data corresponding to the shooting time, the door open/close sensor data acquired at the time of shooting, and the image analysis result for the moving image data are stored in the storage unit 106 or the external storage unit 107. Here, sensor data of a door open/close sensor is used as an example of sensor data acquired from the sensor 12a, crime statistic data (for example, the theft occurrence frequency data) is used as an example of chronological data corresponding to shooting time acquired from the cloud 15a, and data of the number of actions of taking a look around is used as an example of image analysis result data.

Further, the marking unit 1012 performs marking on a predetermined time on the basis of a plurality of pieces of data including at least one of chronological data of a predetermined event corresponding to a shooting time of a shooting place (for example, theft occurrence frequency data of weekdays in an area around home), sensor data acquired at the time of shooting (for example, the door open/close sensor data), and the image analysis result data of the moving image data. The marking may be performed on a time in which a flag indicating that a predetermined condition is satisfied is set for all of a plurality of pieces of target data. A flag process will be described later with reference to a flowchart of FIG. 4. Further, the marking unit 1012 may perform the marking on the basis of a plurality of pieces of data selected by the user.

Further, the interface generating unit 1013 functions as a screen generating unit that generates various kinds of interfaces (that is, display screens) to be displayed on the display device 109. Specifically, for example, the interface generating unit 1013 also generates a user interface used for selecting at least one of the sensor data, the chronological data, and the image analysis result data as data used in the marking process. Further, the interface generating unit 1013 generates an interface including the moving image data and a graph of a plurality of pieces of data including at least one of the sensor data, the chronological data, and the image analysis result data. The graph displayed on the interface may be only a graph selected as the data used in the marking process or may be a graph of all data regardless of whether selected or not. Further, the interface generating unit 1013 may generate an interface further including a seek bar used for designating an image of a desired time and a marking result bar for indicating a marked time, which correspond to the length of the axis of the graph in the time axis direction.

The storage unit 106 is implemented by a read only memory (ROM) for storing programs, operation parameters, and the like used for processing of the control unit 101 and a random access memory (RAM) for temporarily storing appropriately changing parameters and the like.

The external storage unit 107 is a storage medium such as a hard disc drive (HDD) or a solid state drive (SSD) that stores, for example, images captured by the camera 11a, the sensor data, the chronological data, image analysis results, and the like.

The image signal processing unit 102 performs various kinds of processes on the captured images captured by the camera 11 and prepares the captured images. For example, the image signal processing unit 102 performs conversion, adjustment, noise removal, edge detection (image enhancement), and the like on the captured image. The captured image data (image signal) from the camera 11a is input via the I/F 110 in a wired/wireless manner. Further, the image signal processing unit 102 performs image analysis on the prepared captured image, detects a predetermined action of the subject, and outputs the number of predetermined actions or the like obtained at predetermined time intervals to the control unit 101 as the image analysis result data.

The input device 103 is implemented by a keyboard, a mouse, a touch panel, a switch, a button, or the like, and detects an operation input performed by the user and outputs a detected input signal to the input signal processing unit 104. Further, the input device 103 may be implemented by a microphone.

The input signal processing unit 104 performs various kinds of input signal processes on the input signal input from the input device 103, the sensor data of the sensor 12a input via the I/F 110, and the chronological data of the cloud 15a input via the NW I/F 111, and outputs prepared input information to the control unit 101. For example, the input signal processing unit 104 performs conversion (for example, decoding and restoration), noise removal, waveform processing, and the like on the input signal.

The calendar/timer unit 105 measures a time and outputs measured time information to the control unit 101.

The display processing unit 108 performs various kinds of processes for outputting information output from the control unit 101 to the display device 109. For example, the display processing unit 108 may perform conversion, brightness adjustment, and the like on output information.

The display device 109 is an example of an output device and implemented by a display device such as a liquid crystal display (LCD) device, an organic light emitting diode (OLED) display device, or the like. The display device 109 according to the present embodiment displays, on a screen, the interface which is generated by the interface generating unit 1013 and adjusted by the display processing unit 108 in accordance with the control of the control unit 101.

The I/F 110 functions as a data acquiring unit that acquires data from the camera 11a and the sensor 12a in a wired/wireless manner. Further, the I/F 110 may acquire data by reading data from a recording medium in which the captured image is recorded. Further, the NW I/F 111 functions as a receiving unit that acquires data from the cloud 15a via a network (not illustrated) in a wired/wireless manner. Further, the NW I/F 111 may receive data from the camera 11a and the sensor 12a via a network or near field communication.

The configuration of the information processing device 10a according to the present embodiment has been specifically described above. Note that the configuration of the information processing device 10a is not limited to the example illustrated in FIG. 3. For example, the marking unit 1012 may not be provided, and in that case, the marking result bar is not displayed at the time of reproduction, but it is possible to assist in the video search by presenting the graph of the sensor data or the chronological data. Further, the input device 103 and the display device 109 may be separate units and connected to the information processing device 10a in a wired/wireless manner. In addition, the control unit 101 may have an image analysis function provided by the image signal processing unit 102, or the display processing unit 108 may have an interface generation function provided by the control unit 101.

(2-1-2. Operation Process)

Next, an operation process of the information processing device 10a having the above configuration will be specifically described with reference to FIGS. 4 to 7.

Figure 4:
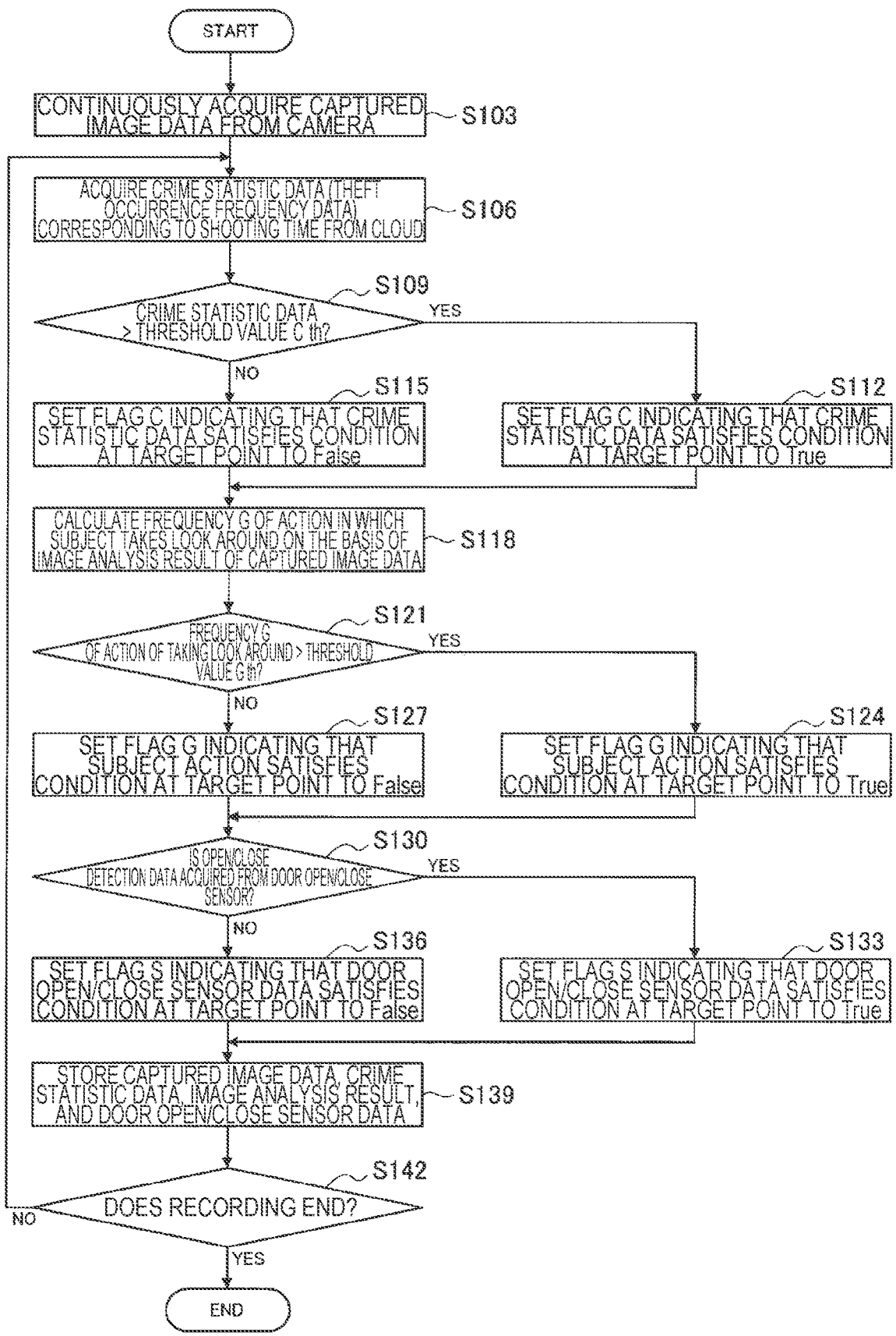
FIG. 4 is a flowchart illustrating a recording process according to the first embodiment.

FIG. 4 is a flowchart illustrating a recording process according to the present embodiment. As illustrated in FIG. 4, the information processing device 10a continuously acquires the captured image data from the camera 11a (step S103).

Then, the information processing device 10a acquires the crime statistic data (for example, the theft occurrence frequency data) corresponding to the shooting time from the cloud 15a (step S106). The crime statistic data corresponding to the shooting time is, for example, statistical data corresponding to a day of week, a season, a shooting time of a shooting day in an area around a shooting place. For example, the information processing device 10a may acquire the crime statistic data obtained at predetermined time intervals on a weekday in July in advance, store the crime statistic data in the external storage unit 107, and extract necessary data appropriately.

Then, the control unit 101 of the information processing device 10a compares a value indicated by the crime statistic data at a target point on the time axis with a predetermined threshold value C th set in advance (step S109). Here, the target point on the time axis indicates a shooting time of a moving image serving as a recording target, and for example, in a case in which the captured image data is stored (that is, recorded) in real time, the target point indicates a current time. The control unit 101 repeats the process of steps S109 to S139 for each predetermined point on the time axis (that is, at predetermined time intervals) and performs the flag process on the crime statistic data or the sensor data associated with the captured image data.

Then, in a case in which the value indicated by the crime statistic data exceeds the threshold value C th (Yes in step S109), the control unit 101 sets a flag C indicating that the crime statistic data satisfies a condition at the target point to True (step S112).

On the other hand, if the value indicated by the crime statistic data does not exceed the threshold value C th (No in step S109), the control unit 101 sets the flag C indicating that the crime statistic data satisfies a condition at the target point to False (step S115).

Then, the control unit 101 calculates a frequency G of the action in which the subject takes a look around on the basis of the image analysis result of the captured image data obtained by the image signal processing unit 102 (step S118), and compares the frequency G of the action of taking a look around at the same target point on the time axis with a predetermined threshold value G th set in advance (step S118).

Then, in a case in which the frequency G of the action of taking a look around exceeds the threshold value G th (Yes in step S118), the control unit 101 sets a flag G indicating that the action in which the subject takes a look around (an example of the image analysis result data) satisfies a condition at the same target point to True (step S124).

On the other hand, in a case in which the value indicated by the crime statistic data does not exceed the threshold value G th (No in step S118), the control unit 101 sets the flag G indicating that the action in which the subject takes a look around satisfies a condition at the same target point to False (step S127).

Then, in a case in which the open/close detection data is acquired from the sensor 12a that detects opening and closing of the door (Yes in step S130), the control unit 101 sets a flag S indicating that the door open/close sensor data satisfies a condition at the same target point to True (step S133).

On the other hand, in a case in which the open/close detection data is not acquired from the sensor 12a that detects opening and closing of the door (No in step S130), the control unit 101 sets the flag S indicating that the door open/close sensor data satisfies a condition at the same target point to False (step S136).

Then, the control unit 101 performs control such that, through the storage control unit 1011, the captured image data acquired from the camera 11a, the crime statistic data which is an example of the chronological data acquired from the cloud 15a, the image analysis result data, and the door open/close sensor data are stored in the external storage unit 107 (step S139). Further, the result of the flag process based on the crime statistic data, the image analysis result data, and the sensor data may be associated with each piece of data or may be separately stored as flag data.

Steps S106 to S139 described above are repeated until the recording ends (step S142). In the present embodiment, when the captured image acquired by the camera 11a is recorded, the flag process (for indicating whether or not the data satisfies a predetermined condition at the target point) is performed on relevant data (the sensor data, the image analysis result data, and the chronological data) at the shooting time point of the captured image of the recording target. The type of data used in the flag process is not limited to the above example, and various sensor data or chronological data may be used. Further, data preselected by the user from a large number of pieces of data may be stored.

The recording process according to the first embodiment has been specifically described above. Next, a process when the recorded moving image data is reproduced will be described with reference to FIG. 5.

Figure 5:
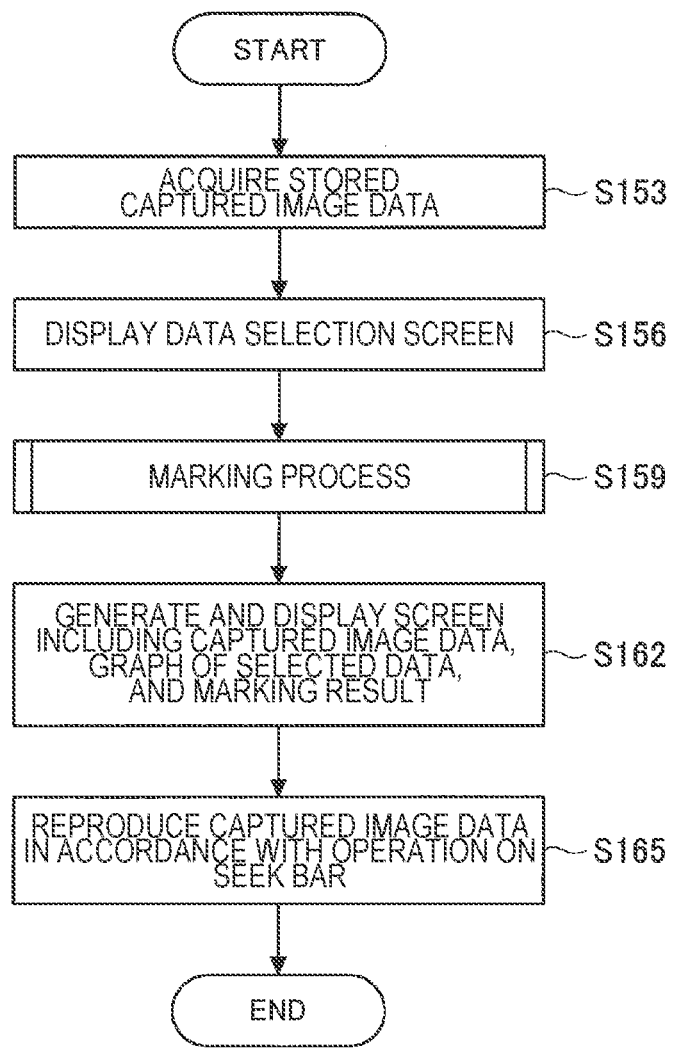
FIG. 5 is a flowchart illustrating a reproduction process according to the first embodiment.

FIG. 5 is a flowchart illustrating the reproduction process according to the present embodiment. As illustrated in FIG. 5, first, the control unit 101 of the information processing device 10a acquires the stored captured image data (specifically, for example, a recorded monitoring camera video) in accordance with a reproduction instruction based on the user operation input from the input device 103 (step S153).

Then, the control unit 101 performs control such that a data selection screen for enabling the user to select data used in the marking process is displayed on the display device 109 (step S156). More specifically, the control unit 101 outputs the selection screen generated by the interface generating unit 1013 to the display processing unit 108 so that the selection screen is displayed on the display device 109. For example, a plurality of pieces of data including at least one of the sensor data, the image analysis data, and the chronological data may be selected in the selection screen.

Then, the control unit 101 performs the marking process based on the selected data through the marking unit 1012 (step S159). The marking process will be described later with reference to FIG. 6.

Then, the control unit 101 generates a screen including the captured image data, the graph of the selected data, and the marking result through the interface generating unit 1013, and causes the generated screen to be displayed on the display device 109 (step S162). An example of the display screen is illustrated in FIG. 6.

Figure 6:
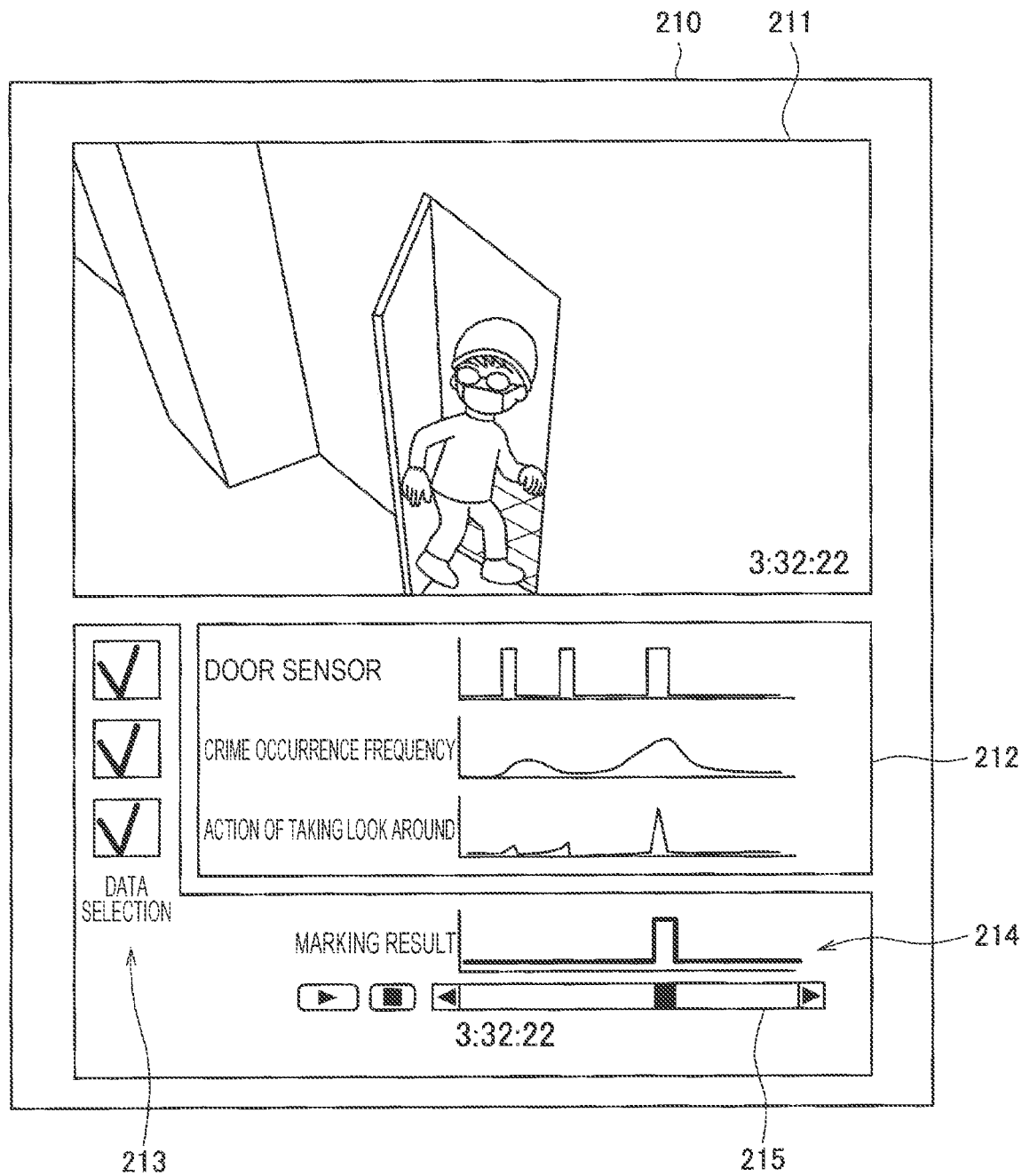
FIG. 6 is a diagram illustrating a display screen example according to the first embodiment.

FIG. 6 is a diagram illustrating a display screen example according to the present embodiment. In the example of FIG. 6, moving image data 211, graphs 212 indicating door sensor data, crime occurrence frequency data, and the number of actions of taking a look around, a marking result bar 214 indicating a marking result, and a seek bar 215 for designating an image reproduction position are displayed on a screen 210. The seek bar 215 and the marking result bar 214 are displayed to correspond to the length of the axis of each of the graphs 212 in the time axis direction. In addition, in the screen 210, check boxes 213 (an example of a selection screen) for data selection are displayed at positions corresponding to the graphs 212 of the respective pieces of data. As described above, the control unit 101 is able to display the graphs 212 of all pieces of data and the marking result bar 214 indicating a result of performing marking by employing the data selected in the check box 213.

Accordingly, the user is able to understand a time at which an abnormality has occurred (for example, a moment at which a burglar broke in) with reference to the graphs 212 or the marking result bar 214 using the selected data, without checking the entire video of the monitoring camera which is taken over a long time.

Then, the control unit 101 reproduces a captured image data of an instructed reproduction point in accordance with the operation on the seek bar 215 performed by the user (step S165). In other words, the user is able to understand a time at which an abnormality is likely to have occurred with reference to the graph 212 or the marking result bar 214 using the selected data, and reproduce sections around the time by operating the seek bar 215. As described above, in the present embodiment, it is possible to assist the user in the video search.

Figure 7:
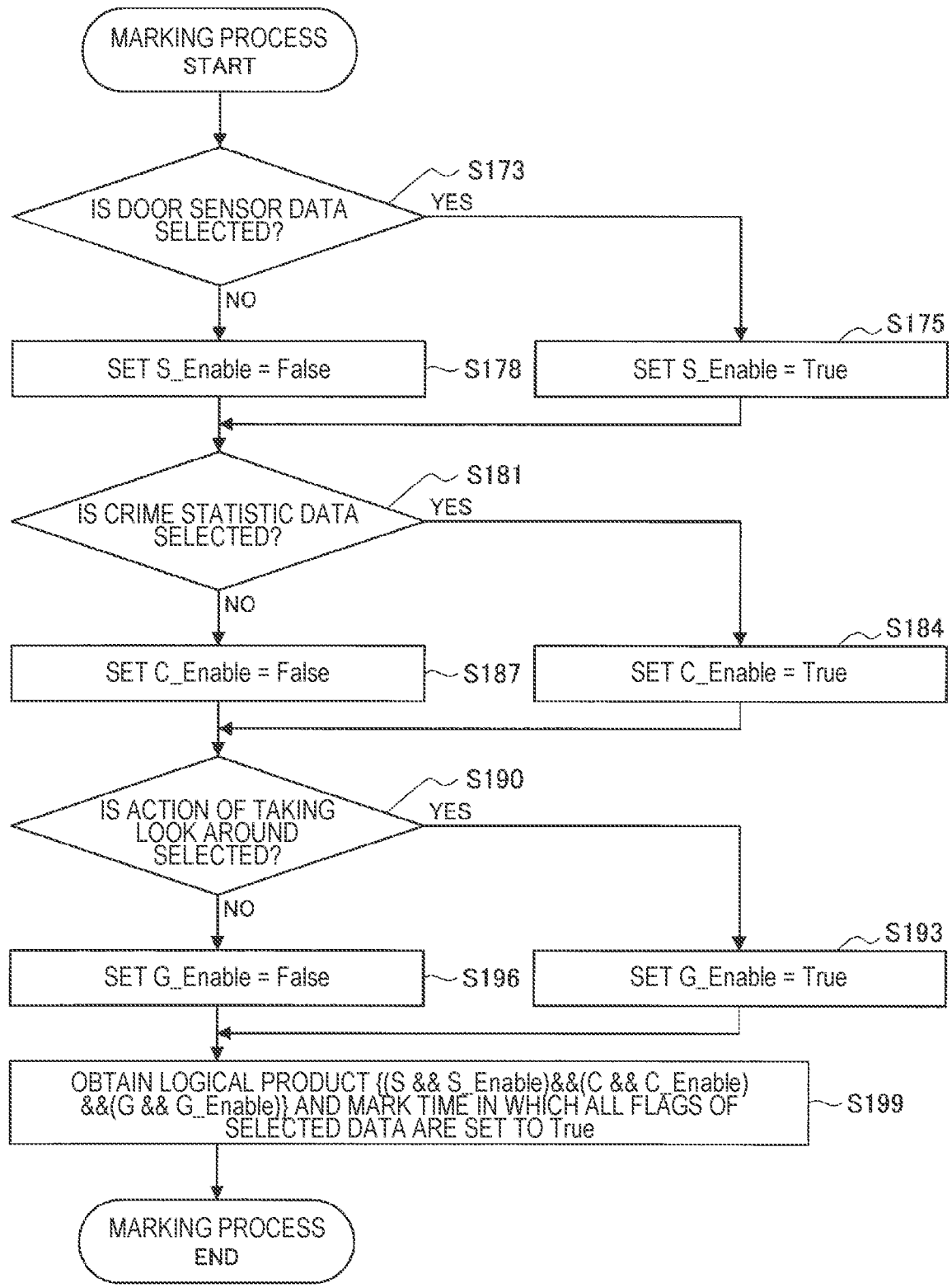
FIG. 7 is a flowchart illustrating a marking process according to the first embodiment.

Next, the marking process described in S159 will be specifically described with reference to FIG. 7. FIG. 7 is a flowchart illustrating the marking process according to the present embodiment. As illustrated in FIG. 7, the marking unit 1012 of the information processing device 10a first determines whether or not the door sensor data is selected by the user (step S173), sets S_Enable=True in a case in which the door sensor data is selected (step S175), and sets S_Enable=False in a case in which the door sensor data is not selected (step S178).

Then, the marking unit 1012 determines whether or not the crime statistic data is selected by the user (step S181), sets C_Enable=True in a case in which the crime statistic data is selected (step S184), and sets C_Enable=False in a case in which the crime statistic data is not selected (step S187).

Then, the marking unit 1012 determines whether or not an action of taking a look around is selected by the user (step S190), sets G_Enable=True in a case in which an action of taking a look around is selected (step S193), and sets G_Enable=False in a case in which an action of taking a look around is not selected (step S196).

Then, the marking unit 1012 obtains a logical product {(S && S_Enable)&&(C && C_Enable)&&(G && G_Enable)} and marks the time in which all the flags of the selected data are set to True (step S199).

(2-1-3. Application Example)

In the first embodiment described above, since assistance in searching for a part having an abnormality such as burglary from the video of the monitoring camera is assumed, the door open/close sensor data, the crime statistic data, and the analysis result data for the action in which the subject takes a look around are used, but the present embodiment is not limited to this example. For example, the moving image search system according to the present embodiment is able to assist in searching of a predetermined moving image under other circumstances. Hereinafter, the description will proceed with reference to FIG. 8.

Figure 8:
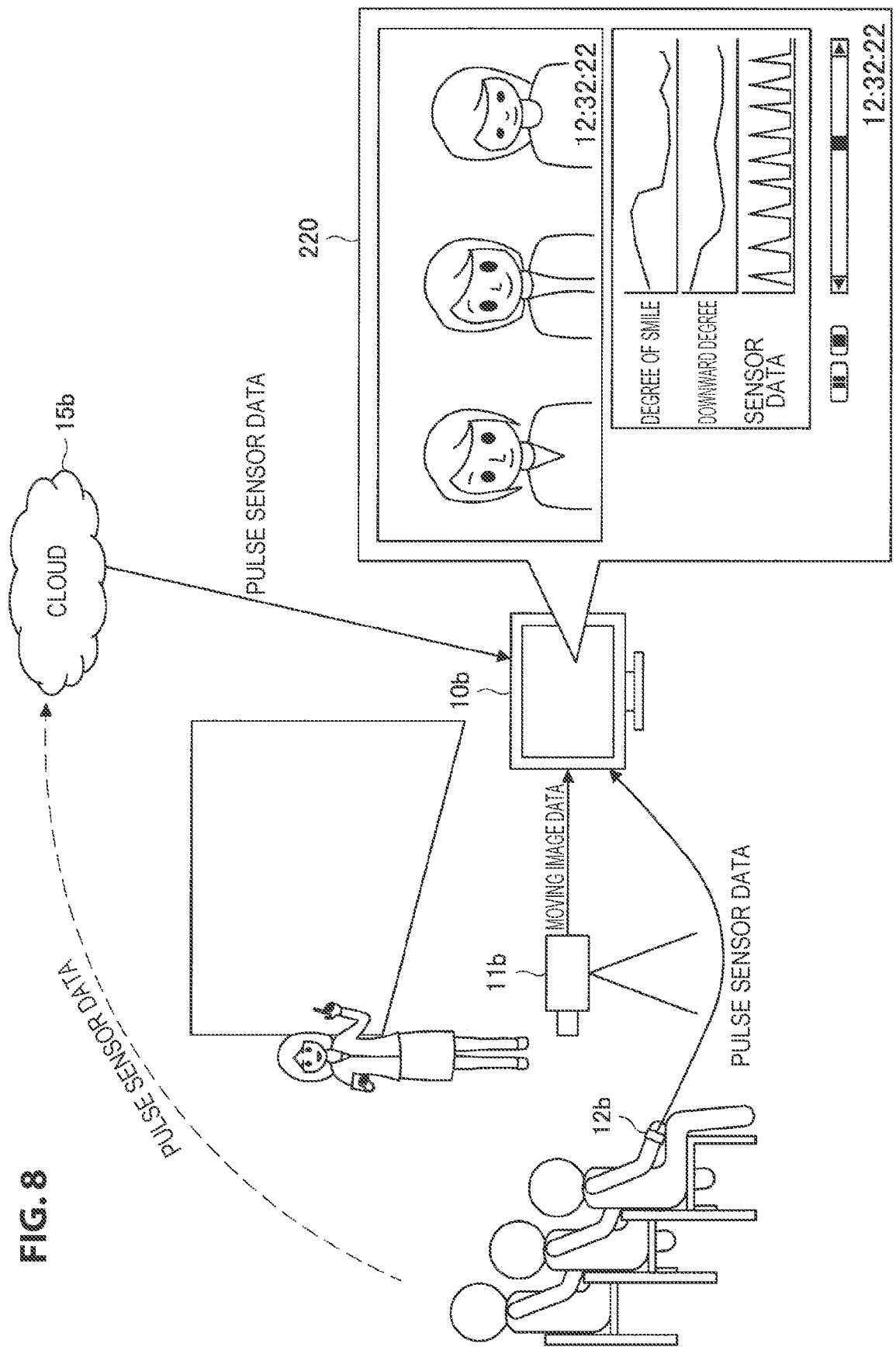
FIG. 8 is a diagram illustrating an application example according to the first embodiment.

FIG. 8 is a diagram illustrating an application example according to the first embodiment. As illustrated in FIG. 8, for example, also when a desired reproduction point is searched for from a moving image data obtained by imaging an audience when a lecture, a class, or the like is given through a camera 11b such as a standing camera, the moving image search system according to the present embodiment can be used.

In this case, an information processing device 10b that executes the moving image search system acquires a video (moving image data) obtained by imaging the audience from the camera 11b and receives sensor data from an Internet of things (IoT) sensor attached to the audience. The sensor data may be acquired by the information processing device 10b via a cloud 15b. The sensor data may be biometric sensor data such as a pulse rate, a body temperature, and an amount of perspiration, for example.

Further, the information processing device 10b performs image analysis on the moving image data acquired from the camera 11b, and calculates a degree of smile of the audience and a downward degree of the face on the basis of a face image extracted from the captured image. In a case in which the face of the audience is oriented substantially downward, it is clearly understood that the audience is dozing or operating a smartphone and not interested in a lecture or a class at all, and thus it can be usefully used for evaluation of a lecturer.

Further, as illustrated in FIG. 8, the information processing device 10b generates a screen 220 including the moving image data, graphs of the image analysis result data (here, the degree of smile and the downward degree of the face, for example) and the sensor data, and a seek bar which corresponds to the length of the axis of each of the graphs in the time axis direction and is used for performing a reproduction operation, and displays the screen 220. Accordingly, the user is able to easily search for a desired scene from the moving image data having a long duration with reference to the sensor data such as the degree of smile, the downward degree of the face, or the pulse of the audience.

2-2. Second Embodiment

Next, a second embodiment will be described in detail with reference to FIGS. 9 to 12. In the present embodiment, when content of sports broadcast such as the Olympic Games, soccer, baseball, or tennis is watched, in a case in which there is no time to watch all games played for a long time, but a digest of news programs is unsatisfactory, assistance in searching for a reproduction scene of content is performed.

Figure 9:
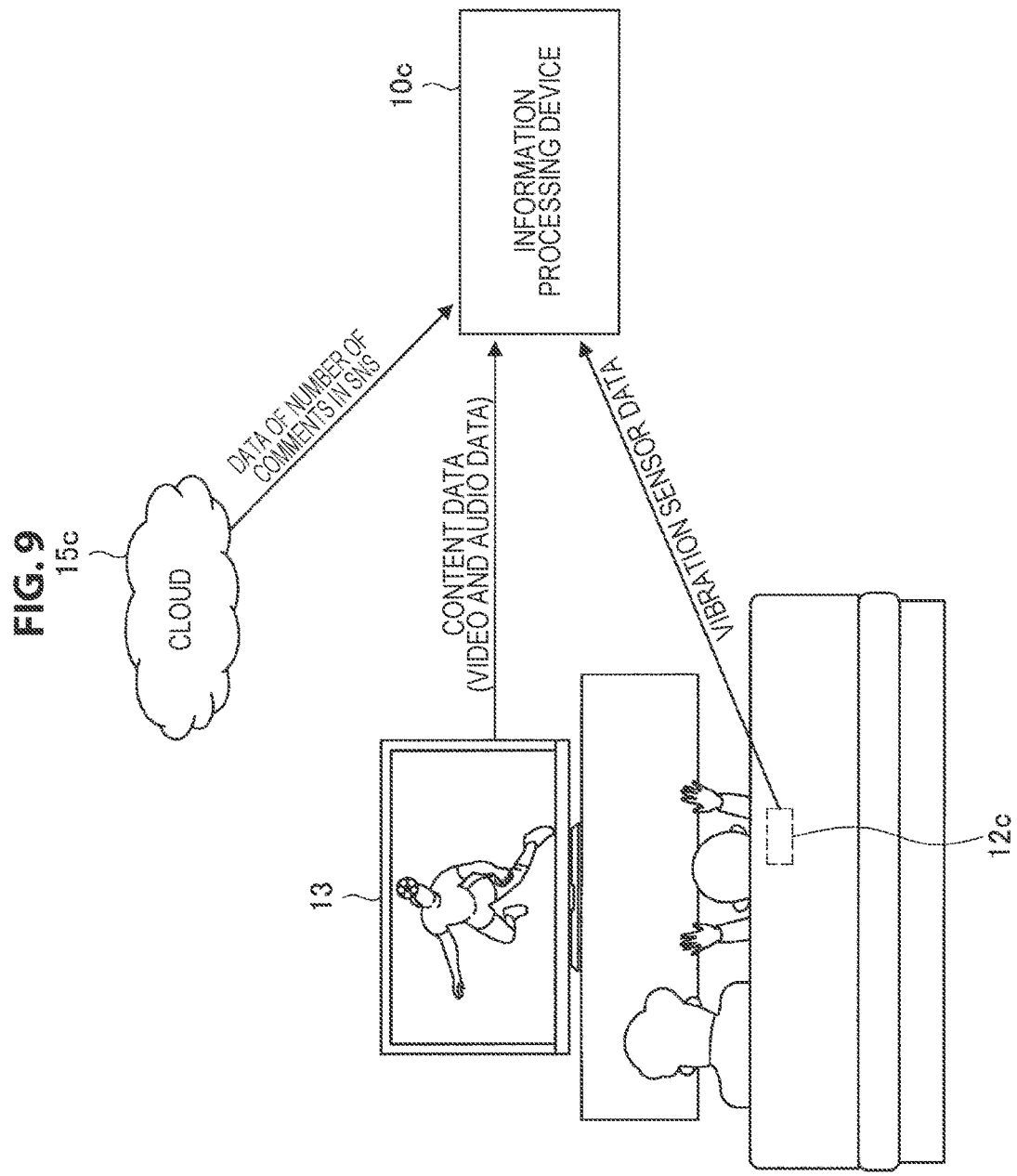
FIG. 9 is a diagram for describing an overview of a moving image search system according to a second embodiment.

FIG. 9 is a diagram for describing an overview of the moving image search system according to the second embodiment. As illustrated in FIG. 9, an information processing device 10c according to the present embodiment acquires content data (including a video and an audio) from a display device 13, acquires sensor data associated with content from a sensor 12c, and acquires chronological data associated with content from a cloud 15c.

Here, for example, the sensor 12c is assumed to be a vibration sensor installed in a sofa on which a person viewing content through the display device 13 seats. Further, the sensor 12c is not limited to a sensor installed in the sofa in the user's house but may be, for example, a sensor installed in a sofa on which a friend sits while viewing the same content in a friend's house. The information processing device 10c may acquire the sensor data from the sensor installed in the sofa in the friend's house via a network. In general, in a highlight scene which is a point of interest, people who are watching perform some sort of physical reaction, and jump or take a victory pose by flexing, and so it is possible to detect vibration when they get excited during watching through the vibration sensor installed in the sofa.

The chronological data acquired from the cloud 15c is, for example, chronological data of the number of comments on the same content written in real time on a bulletin board on the Internet when the same content is broadcast or the number of comments on the same content posted on a social networking service (SNS). Alternatively, the chronological data may be viewing rate data provided by a viewing rate research company or chronological data of the number of moving image comments written in association with each reproduction scene of the same content in a moving image site. Alternatively, the chronological data may be chronological data of statistics of each player or a team in a case in which content is a sports broadcast.

For example, image/audio analysis result data of content is data such as a degree of excitement, a magnitude of cheering, or character analysis for telop ("goal!" or the like) obtained by image/audio analysis.

The information processing device 10b stores content such as sports broadcast, the chronological data (data of the number of comments in SNS or the like) acquired from the corresponding cloud 15c at a time of content broadcasting, the sensor data detected by the sensor 12c at the time of content broadcasting (for example, vibration data of the sofa or the like), and the image/audio analysis result of the content (for example, the magnitude of cheering or the like), as a storage process. Further, the information processing device 10c is able to assist the user in the video search by displaying graphs based on the chronological data, the sensor data, and the image analysis result data together with the content, as a reproduction process. In other words, for example, since there is a high possibility that a play or an event in which many viewers are interested will be shown in a video of a time in which cheering is great, vibration of the sofa is detected, and the number of comments in SNS is large, the user is able to search for a desired scene without checking the entire video having a long duration. In particular, the sensor data and the chronological data which are not obtained from the image analysis are displayed through the graph corresponding to the time axis of the moving image data, and thus the user is able to intuitively understand a point (that is, a time) of a desired scene on the time axis.

Figure 10:
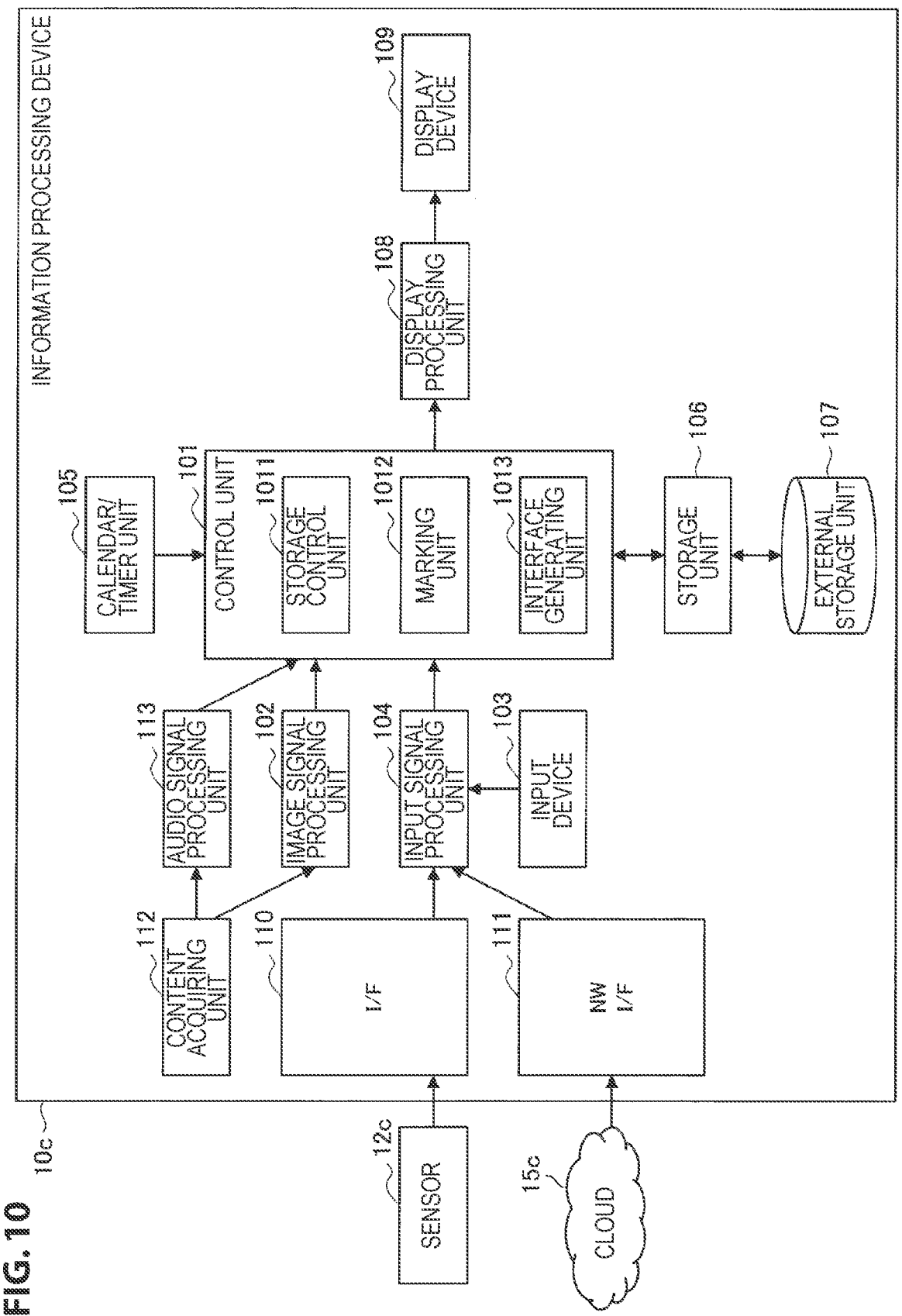
FIG. 10 is a block diagram illustrating a configuration example of an information processing device according to the second embodiment.

Next, a configuration of the information processing device 10c according to the second embodiment will be described with reference to FIG. 10. FIG. 10 is a block diagram illustrating a configuration example of the information processing device 10c according to the present embodiment. As illustrated in FIG. 10, the information processing device 10c according to the present embodiment includes a control unit 101, an image signal processing unit 102, an input device 103, an input signal processing unit 104, a calendar/timer unit 105, a storage unit 106, an external storage unit 107, a display processing unit 108, a display device 109, an I/F 110, an NW I/F 111, a content acquiring unit 112, and an audio signal processing unit 113.

The content acquiring unit 112 acquires content (including video/audio data and metadata) of a broadcast program, an Internet program, and the like displayed on the display device 13. The content such as the broadcast program may be acquired from the display device 13 (a television receiver) or may be acquired by the content acquiring unit 112 of the information processing device 10c functioning as a television receiver. The content acquired by the content acquiring unit 112 is subjected to audio analysis performed in the audio signal processing unit 113 and subject to image analysis performed in the image signal processing unit 102. For example, the audio signal processing unit 113 extracts the magnitude of cheering by analyzing the audio data included in the content. Further, for example, the image signal processing unit 102 extracts a quantity of motion of the subject (here, the player) who is estimated to be excited or a specific action (shooting or a corner kick in the case of soccer, and volley or smash in the case of tennis) through analysis of the moving image data (that is, video data) included in the content, or performs character analysis of telop.

As described above, the second embodiment differs from the first embodiment in that the content acquiring unit 112 acquires the content, and the audio signal processing unit 113 performs the audio analysis on the content.

Further, the control unit 101 of the information processing device 10c causes the selection screen generated by the interface generating unit 1013 to be displayed on the display device 109. For example, it is possible to select a plurality of pieces of data including at least one of the sensor data, the image analysis data, and the chronological data in the selection screen. An example of the selection screen is illustrated in FIG. 11.

Figure 11:
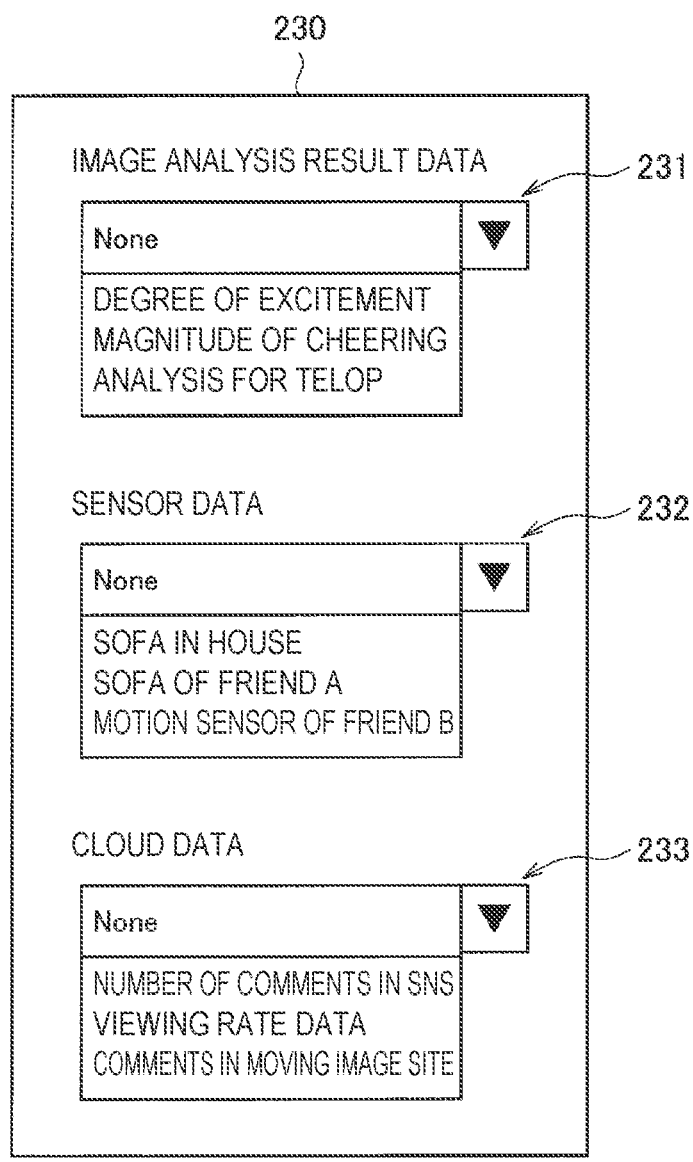
FIG. 11 is a diagram illustrating an example of a data selection screen according to the second embodiment.

FIG. 11 is a diagram illustrating an example of the data selection screen according to the second embodiment. In the example of FIG. 11, a selection screen 231 for selecting the image analysis result data, a selection screen 232 for selecting the sensor data, and a selection screen 233 for selecting the cloud data are displayed on a screen 230. All the selection screens have a selection menu of a pull-down type, and for example, it is possible to select the image analysis result data of one of the degree of excitement, the magnitude of cheering, and telop analysis in the selection screen 231 for selecting the image analysis result data. Further, it is possible to select the sensor data of one of a vibration sensor installed in a sofa in a house (the user's house), a vibration sensor installed in a sofa of a friend A, and a motion sensor attached to a friend B in the selection screen 232 for selecting the sensor data. Further, it is possible to select the cloud data of one of the number of comments in the SNS, the viewing rate data, and the number of comments in the moving image site in the selection screen 233 for selecting the cloud data.

Then, the control unit 101 generates a screen including a graph of each piece of selected data and a content reproduction screen (the moving image data) through the interface generating unit 1013 and causes the generated screen to be displayed on the display device 109. Further, the control unit 101 may generate a screen further including a marking result bar indicating a result of marking performed by the marking unit 1012 on the basis of a graph of each piece of selected data through the interface generating unit 1013 and cause the generated screen to be displayed on the display device 109. An example of the display screen is illustrated in FIG. 12.

Figure 12:
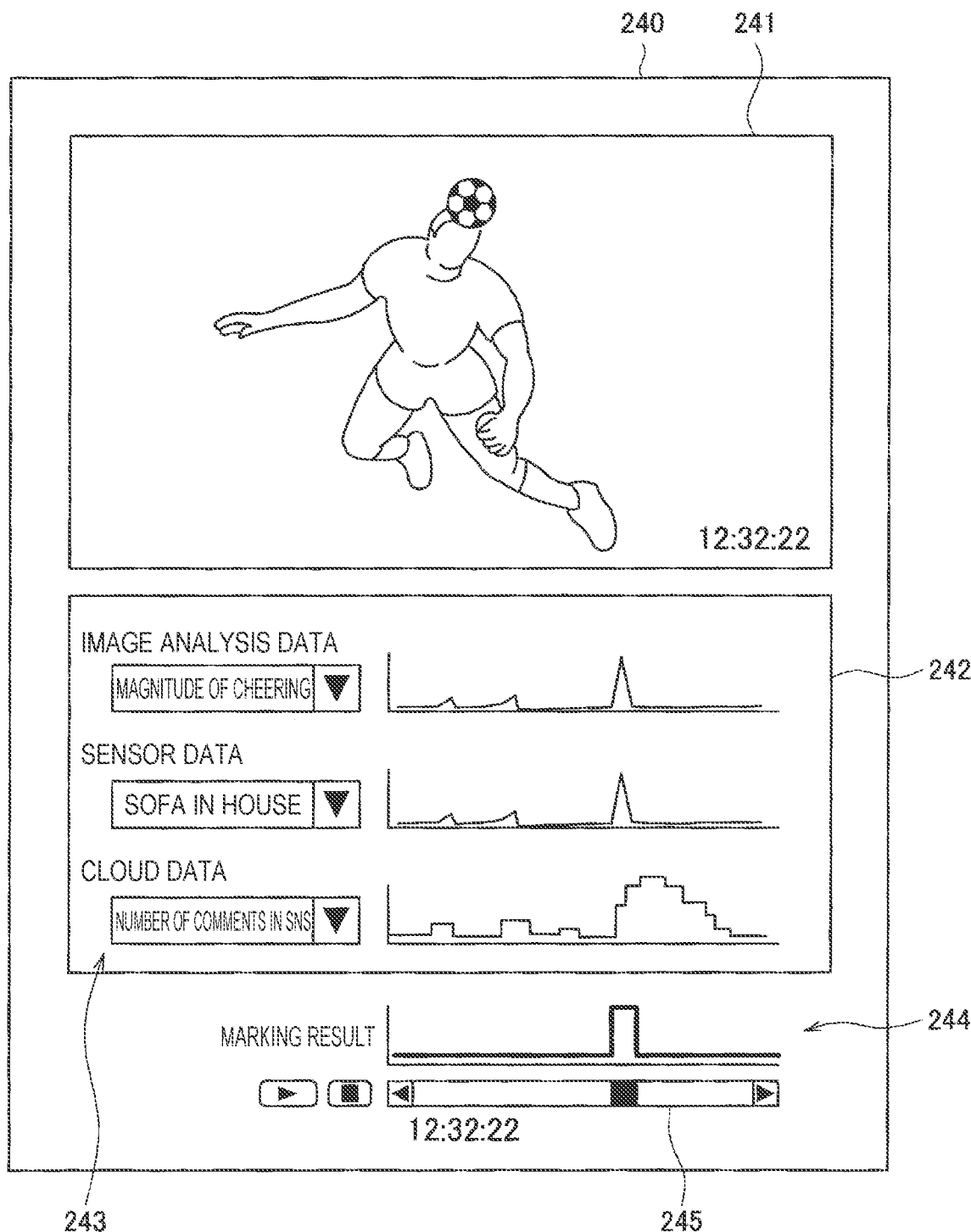
FIG. 12 is a diagram illustrating an example of a display screen according to the second embodiment.

FIG. 12 is a diagram illustrating a display screen example according to the present embodiment. In the example of FIG. 12, moving image data 241, graphs 242 indicating selected image analysis data, selected sensor data, and selected cloud data, a marking result bar 244 indicating a marking result, and a seek bar 245 for designating an image reproduction position are displayed on a screen 240. The seek bar 245 and the marking result bar 244 are displayed to correspond to the length of the axis of each of the graphs 242 in the time axis direction. In addition, a selection screen 243 in which graph display and data employed in the marking process can be selected is displayed on the screen 240.

Accordingly, the user is able to understand a point (that is, a time) on the time axis at which a highlight scene is positioned with reference to the graphs 242 of the selected data or the marking result bar 244, without checking all recorded images of a sports broadcast for a long time.

Then, the control unit 101 reproduces recorded image data of an instructed point in accordance with an operation on the seek bar 245 performed by the user. Thus, in the present embodiment, it is possible to assist the user in the video search.

The second embodiment has been described above. Note that the case of the sports broadcast has been described as an example of the content (video/audio data), but the substance of content serving as a video search assistance target of the present embodiment is not limited to this example and may be other broadcast programs such as an opening ceremony or a closing ceremony of the Olympic Games.

2-3. Third Embodiment

Next, a third embodiment will be described in detail with reference to FIGS. 13 to 16. In the present embodiment, assistance in a video search when a target is imaged for a long time and verified is performed. Typically, when an experiment of verifying a target is performed, a method of looking back a video obtained by imaging a target for a long time and checking a status change of the target is effective, but it requires a great effort to view the entire video having a long duration from the beginning. In this case, through the moving image search system according to the present embodiment, it is possible to assist in the video search by displaying the graph of the sensor data associated with the captured image or the chronological data corresponding to the shooting time in addition to an analysis result for the captured image.

Figure 13:
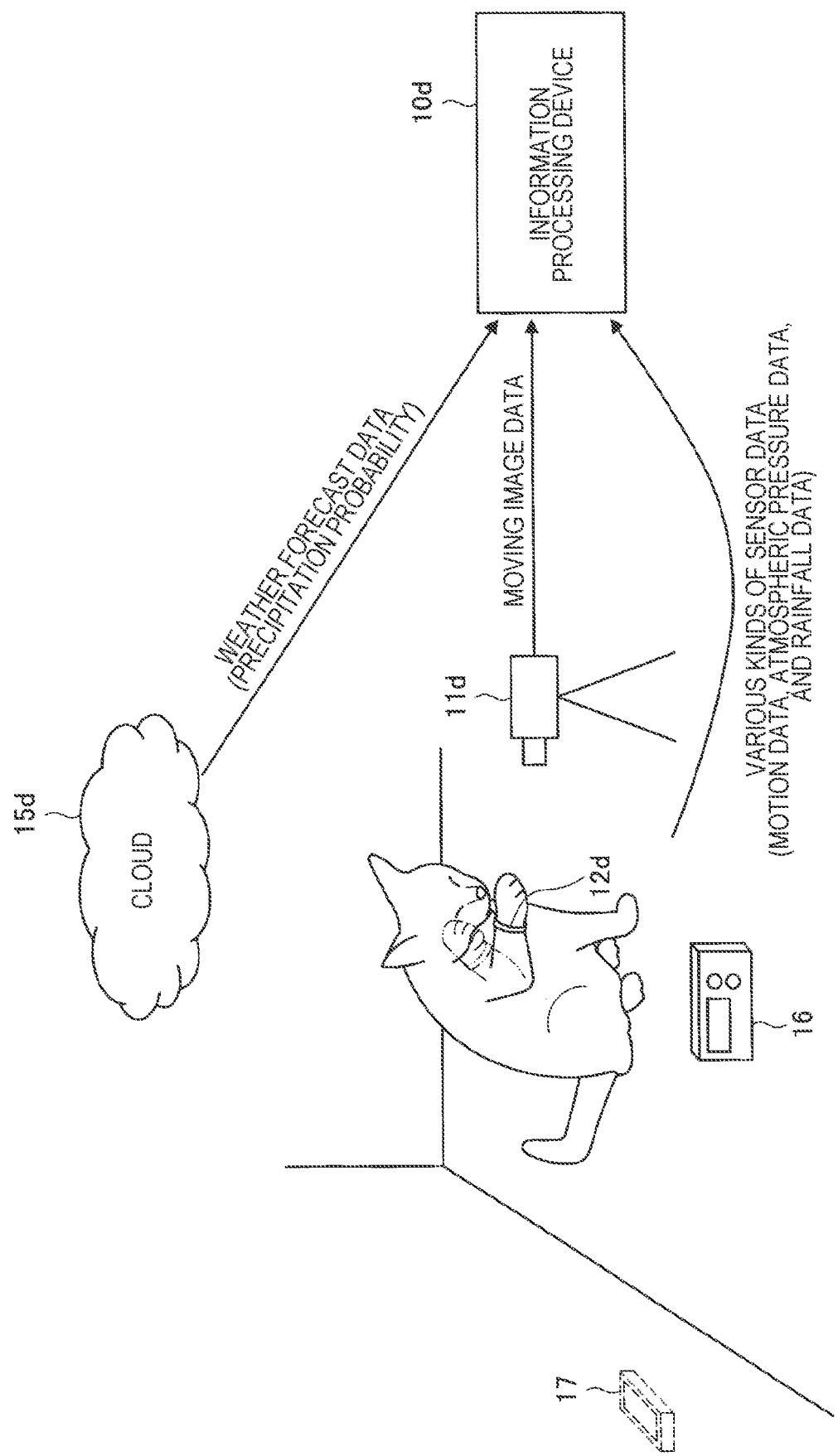
FIG. 13 is a diagram for describing an overview of a moving image search system according to a third embodiment.

FIG. 13 is a diagram for describing an overview of the moving image search system according to the third embodiment. In the example of FIG. 13, for example, an example of verifying a legend "it rains if a cat washes a face" is assumed. In this case, an information processing device 10d acquires moving image data obtained by imaging a cat from a camera 11d. In addition, the information processing device 10d acquires sensor data indicating a motion of the cat from a sensor 12d attached to the cat, acquires atmospheric pressure data from an atmospheric pressure sensor 16 placed near the cat, and acquires rainfall data from a rainfall sensor 17 placed outside an experiment place, as various kinds of sensor data. Further, the information processing device 10d acquires, for example, weather forecast data (specifically, a precipitation probability) as the chronological data associated with the experiment from a cloud 15d.

The information processing device 10d displays a graph of the sensor data corresponding to the shooting time or the precipitation probability when the captured moving image data (that is, a verification video record) is reproduced, on the basis of various kinds of acquired data, and assists the user in a search for a verification video. Accordingly, the user performs the verification centering on a video of a time at which a value indicated by a graph satisfies a condition using a graph of the sensor data or the like corresponding to the shooting time as a sensor index of the video, without viewing the entire verification video record, and thus it is possible to reduce a period of time related to the verification.

Note that a configuration of the information processing device 10d according to the third embodiment is similar to the configuration of the information processing device 10c according to the first embodiment described above with reference to FIG. 3, and thus detailed description thereof is omitted.

Next, an operation process of the moving image search system according to the present embodiment will be described with reference to FIGS. 14 and 15.

Figure 14:
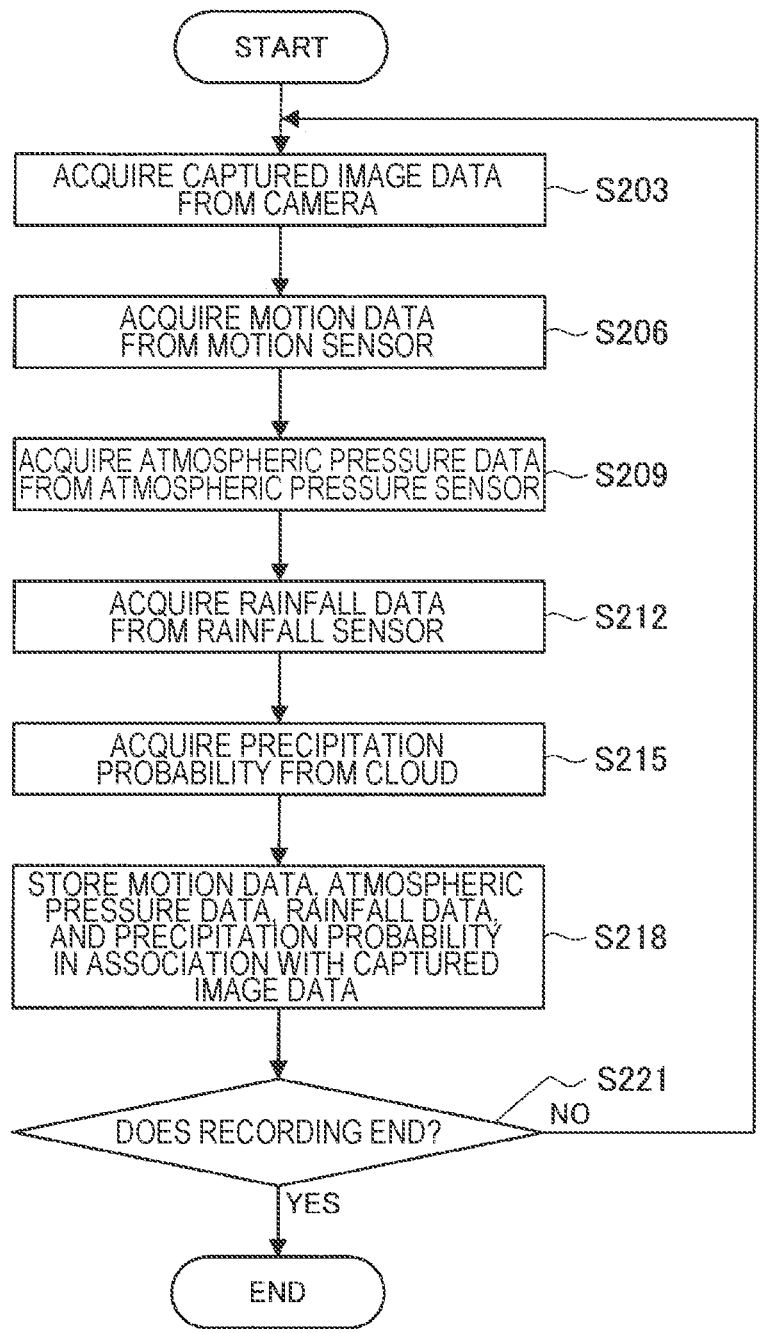
FIG. 14 is a flowchart illustrating a recording process according to the third embodiment.

FIG. 14 is a flowchart illustrating a recording process according to the present embodiment. As illustrated in FIG. 14, the information processing device 10d first acquires the captured image data from the camera 11d (step S203).

Then, the information processing device 10d acquires motion data from the sensor 12d (motion sensor) for detecting a motion of the cat (step S206).

Then, the information processing device 10d acquires the atmospheric pressure data from the atmospheric pressure sensor 16 (step S209).

Then, the information processing device 10d acquires the rainfall data from the rainfall sensor 17 (step S212).

Then, the information processing device 10d acquires the precipitation probability data from the cloud 15d (step S215).

Then, the information processing device 10d stores the motion data, the atmospheric pressure data, the rainfall data, and the precipitation probability data in association with the captured image data (step S218).

Steps S203 to S221 described above are repeated until the recording ends (step S221). The process of steps S203 to S215 is not limited to the illustrated order and may be performed in parallel. Further, the information processing device 10d may cause an operation screen for operating the start or the stop of the recording to be displayed on the display device 109. Further, the graphs of the acquired motion data, atmospheric pressure data, rainfall data, and precipitation probability data may be displayed on the operation screen together with the captured image being recorded.

The recording process according to the third embodiment has been specifically described above. Next, a process when the recorded moving image data is reproduced will be described with reference to FIG. 15.

Figure 15:
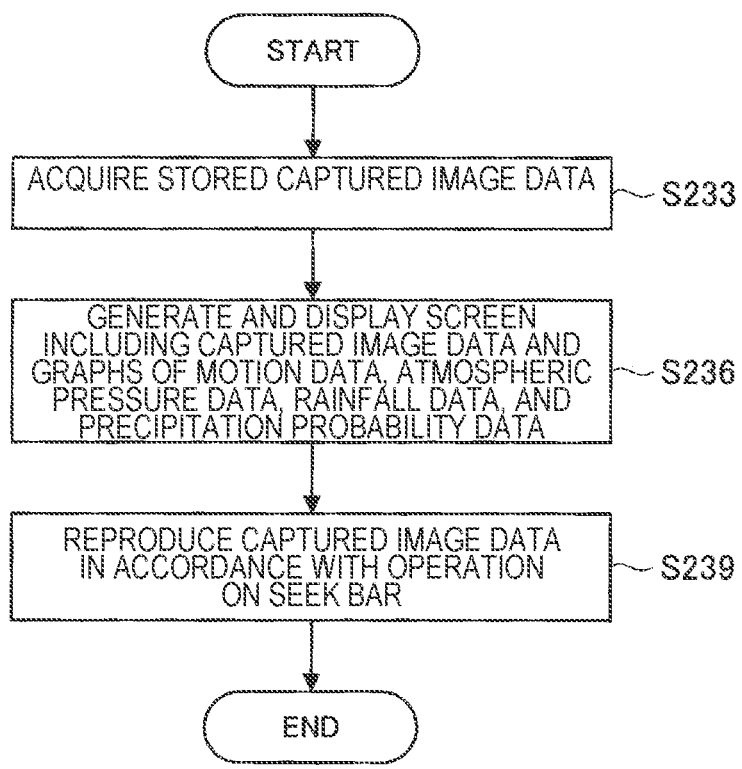
FIG. 15 is a flowchart illustrating a reproduction process according to the third embodiment.

FIG. 15 is a flowchart illustrating the reproduction process according to the present embodiment. As illustrated in FIG. 15, the information processing device 10d first acquires the stored captured image data (specifically, for example, the recorded verification video) in accordance with the reproduction instruction based on the user operation provided from the input device 103 (step S233).

Then, the information processing device 10d generates a screen including the captured image data and graphs of the motion data, the atmospheric pressure data, the rainfall data, and the precipitation probability data and causes the generated screen to be displayed on the display device 109 (step S236).

Then, the information processing device 10d reproduces the captured image data of an instructed reproduction point in response to an operation on the seek bar performed by the user (step S239).

Figure 16:
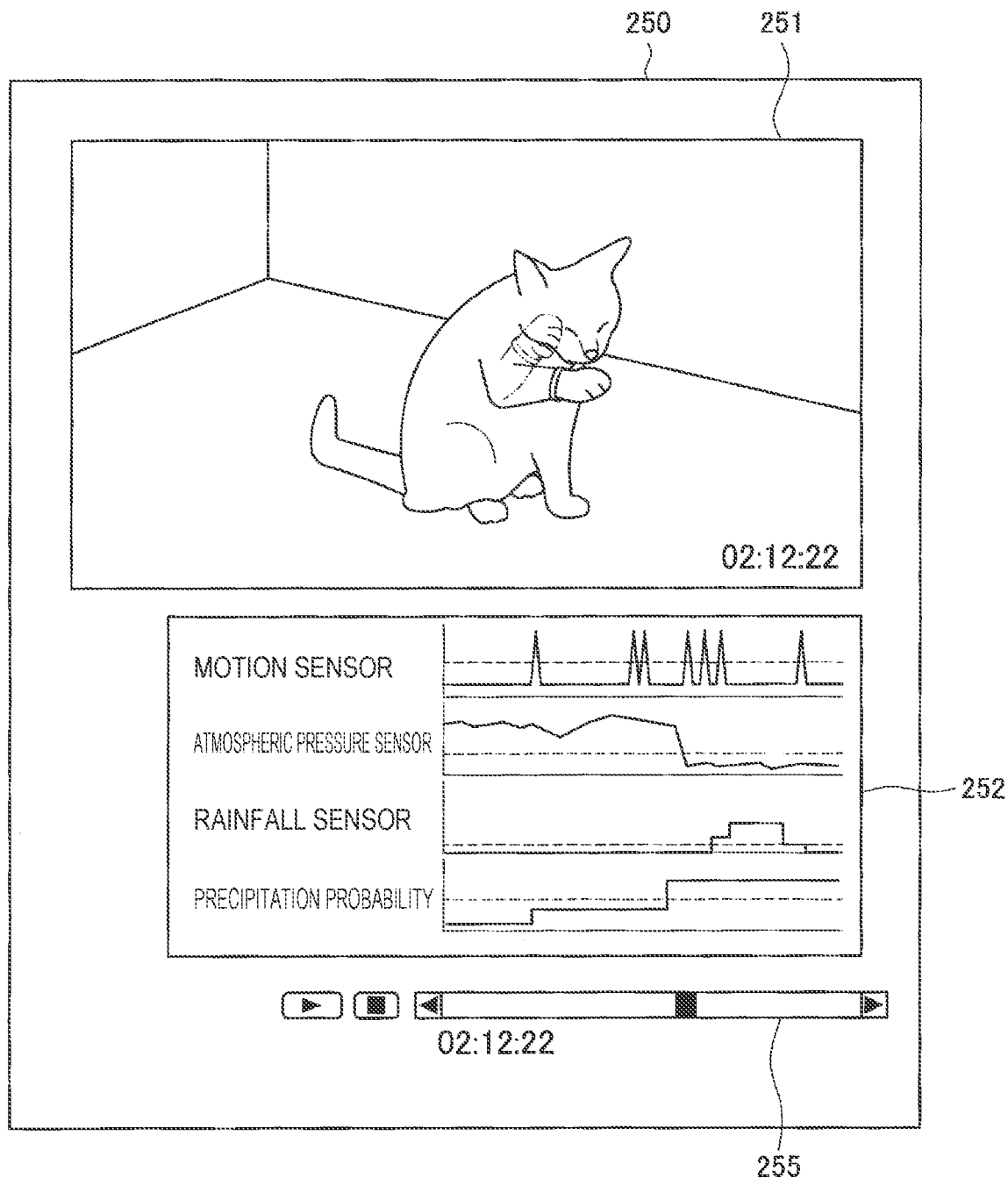
FIG. 16 is a diagram illustrating a display screen example according to the third embodiment.

Here, an example of the display screen is illustrated in FIG. 16. FIG. 16 is a diagram illustrating a display screen example according to the present embodiment. In the example of FIG. 16, moving image data 251, graphs 252 indicating various kinds of sensor data of the motion sensor, the atmospheric pressure sensor, and the rainfall sensor and data of precipitation probability, and a seek bar 255 for designating an image reproduction position are displayed on a screen 250. The seek bar 255 is displayed to correspond to the length of the axis of each of the graphs 252 in the time axis direction.

Accordingly, the user is able to perform the verification with a predetermined reproduction point with reference to the graphs 252 without checking the entire verification video having a long duration. Specifically, for example, when a legend "it rains when a cat washes a face" is verified, it is checked whether or not there is a scene in which the cat is washing the face by operating the seek bar 255 so that a time at which the motion of the cat is detected through the motion sensor is reproduced. Then, in a case in which there is a scene in which the cat is washing the face, the verification for the legend is performed with reference to the atmospheric pressure sensor data, the rainfall sensor data, and the precipitation probability data before and after the time. Further, the user checks a motion of the cat by reproducing the scene in which the motion of the cat is detected by the motion sensor before and after a time at which the atmospheric pressure is decreased, a time at which the precipitation probability is increased, or a time at which the precipitation is detected by the rainfall sensor. As described above, the user is able to perform the verification with a high degree of certainty without checking the entire verification video having a long duration.

In the above-described embodiment, since the marking process is not performed, the marking result bar indicating the marking result is not displayed on the screen 250 illustrated in FIG. 16. Also in the third embodiment, in a case in which the marking process based on a plurality of pieces of data is performed, the marking result bar can be displayed on the screen 250.

In the above-described embodiment, a video for verifying an animal has been used as an example, but the present embodiment is not limited to this example, and the present embodiment can be applied, for example, when analysis for a human being, an object, or a thing such as a communication style between persons, a behavior of a human being on an object or an animal, a consumption behavior of a human being, or an economic behavior is performed on the basis of a video having a long duration.

3. Conclusion

As described above, in the moving image search system according to an embodiment of the present disclosure, it is possible to assist in a search for a moving image using a graph of data which is not obtained from image analysis associated with a moving image.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program causing hardware such as a CPU, a ROM, and a RAM installed in the information processing device 10 to perform the functions of the information processing device 10. A computer-readable storage medium including the computer program stored therein is also provided.

In each of the above-described embodiments, the example in which the moving image search system is executed by the information processing device 10 has been described, but the present disclosure is not limited thereto, and at least some of the functions of the information processing device 10 may be executed on a server. For example, the storage control unit 1011, the marking unit 1012, and the interface generating unit 1013 may be disposed on a server connected to the information processing device 10 via a network.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system, including:
a moving image data acquiring unit configured to acquire moving image data;
a communication unit configured to receive sensor data associated with the moving image data and chronological data corresponding to a shooting time of the moving image data;
an image signal processing unit configured to perform image analysis on the moving image data and generate image analysis result data; and
a control unit configured to generate an interface including the moving image data and graphs of at least two pieces of data among the sensor data, the chronological data, and the image analysis result data.

(2)
The information processing system according to (1),
in which the control unit generates a user interface for selecting at least one of the sensor data, the chronological data, and the image analysis result data.

(3)
The information processing system according to (2),
in which the control unit performs marking on a predetermined time on a basis of a plurality of pieces of data selected by the user interface.

(4)
The information processing system according to (3),
in which the control unit performs marking on a time in which a flag indicating that a predetermined condition is satisfied is set for all the selected plurality of pieces of data.

(5)
The information processing system according to (3) or (4),
in which the control unit generates a marking result bar which corresponds to a length of an axis of the graph in a time axis direction and is used to indicate the marked time.

(6)
The information processing system according to any one of (1) to (5),
in which the control unit generates a seek bar which corresponds to a length of an axis of the graph in a time axis direction and is used to designate an image of a desired time.

(7)
The information processing system according to any one of (1) to (6),
in which the control unit generates an interface including the moving image data and graphs of the sensor data, the chronological data, and the image analysis result data.

(8)
The information processing system according to any one of (1) to (7),
in which the sensor data is detected by a sensor attached to a subject of the moving image data.

(9)
The information processing system according to (5),
in which the image signal processing unit detects a specific motion of a subject through the image analysis for the moving image data, and
the control unit performs marking on a time at which a frequency of the specific motion exceeds a predetermined threshold value.

(10)
The information processing system according to any one of (1) to (9),
in which the chronological data is data related to a predetermined event corresponding to the shooting time of the moving image data, and
the control unit performs marking on a time at which a value of the event satisfies a predetermined condition.

(11)
The information processing system according to any one of (1) to (7),
in which the sensor data is motion data which indicates a motion of a subject viewing the moving image data and is detected by a motion sensor, and
the control unit performs marking on a time at which a value of the motion data satisfies a predetermined condition.

(12)
The information processing system according to any one of (1) to (11), further including
an audio signal processing unit configured to perform audio analysis on the moving image data and generate audio analysis result data,
in which the control unit generates an interface including the moving image data and a graph of at least one piece of data among the sensor data, the chronological data, the image analysis result data, and the audio analysis result data.

(13)
An information processing method, including:
acquiring, by a processor, moving image data;
receiving, by the processor, sensor data associated with the moving image data and chronological data corresponding to a shooting time of the moving image data;
performing, by the processor, image analysis on the moving image data and generating image analysis result data; and
generating, by the processor, an interface including the moving image data and graphs of at least two pieces of data among the sensor data, the chronological data, and the image analysis result data.

(14)
A computer-readable recording medium having a program recorded thereon, the program causing a computer to function as:
a moving image data acquiring unit configured to acquire moving image data;
a communication unit configured to receive sensor data associated with the moving image data and chronological data corresponding to a shooting time of the moving image data;
an image signal processing unit configured to perform image analysis on the moving image data and generate image analysis result data; and
a control unit configured to generate an interface including the moving image data and graphs of at least two pieces of data among the sensor data, the chronological data, and the image analysis result data.

REFERENCE SIGNS LIST 10 (10a, 10b, 10c, 10d) information processing device
101 control unit
1011 storage control unit
1012 marking unit
1013 interface generating unit
102 image signal processing unit
103 input device
104 input signal processing unit
105 calendar/timer unit
106 storage unit
107 external storage unit 108 display processing unit
109 display device
110 I/F
111 NW I/F
112 content acquiring unit
113 audio signal processing unit
11 (11a, 11b, 11d) camera
12 (12a, 12b, 12d) sensor
13 display device
15 (15a, 15b, 15c, 15d) cloud
16 atmospheric pressure sensor
17 rainfall sensor
210, 220, 230, 240, 250 screen
211, 241, 251 moving image data
212, 242, 252 graph
213 check box
214, 244 marking result bar
215, 245, 255 seek bar
215 marking result bar
220 screen
231, 232, 233, 243 selection screen

The invention claimed is:

1. An information processing system, comprising:
a moving image data acquiring unit configured to acquire moving image data;
a communication unit configured to receive sensor data associated with the moving image data, and chronological data corresponding to a shooting time period of the moving image data, wherein
the chronological data is data related to an event occurrence frequency data obtained based on an occurrence of an event in a time period prior to the shooting time period, and
the time period corresponds to the shooting time period of the moving image data;
an image signal processing unit configured to:
execute image analysis on the moving image data;
generate image analysis result data based on the image analysis; and
detect a specific motion of a first subject, included in the moving image data, based on the generated image analysis result data; and
a control unit configured to:
generate an interface including the moving image data and graphs of at least two pieces of data among the sensor data, the chronological data, or the image analysis result data;
generate a marking result bar with a mark on a first time instance at which a frequency of the specific motion of the first subject exceeds a threshold value; and
mark a second time instance at which a value of the event satisfies a first specific condition.

2. The information processing system according to claim 1,
wherein the control unit is further configured to generate a user interface for selection of at least one of the sensor data, the chronological data, or the image analysis result data.

3. The information processing system according to claim 2,
wherein the control unit is further configured to mark the first time instance based on a selection of the at least two pieces of data among the sensor data, the chronological data, or the image analysis result data.

4. The information processing system according to claim 3, wherein
the control unit is further configured to mark the first time instance in which a flag, indicating that a second specific condition is satisfied, is set for the selected at least two pieces of data.

5. The information processing system according to claim 1,
wherein the marking result bar corresponds to a length of an axis of a graph in a time axis direction and indicates the marked first time instance.

6. The information processing system according to claim 1,
wherein the control unit is further configured to generate a seek bar which corresponds to a length of an axis of a graph in a time axis direction and designate an image of a desired time.

7. The information processing system according to claim 1,
wherein the control unit is further configured to generate an interface including the moving image data and graphs of the sensor data, the chronological data, and the image analysis result data.

8. The information processing system according to claim 1,
wherein the sensor data is detected by a sensor attached to a subject in the moving image data.

9. The information processing system according to claim 1,
wherein the sensor data is motion data which indicates a specific motion of a second subject that views the moving image data, and is detected by a motion sensor, and
the control unit is configured to mark a third time instance at which a value of the motion data satisfies a second specific condition.

10. The information processing system according to claim 1, further comprising
an audio signal processing unit configured to execute an audio analysis on the moving image data and generate audio analysis result data,
wherein the control unit is further configured to generate an interface including the moving image data and a graph of at least one piece of data among the sensor data, the chronological data, the image analysis result data, or the audio analysis result data.

11. An information processing method, comprising:
acquiring, by a processor, moving image data;
receiving, by the processor, sensor data associated with the moving image data, and chronological data corresponding to a shooting time period of the moving image data, wherein
the chronological data is data related to an event occurrence frequency data obtained based on an occurrence of an event in a time period prior to the shooting time period, and
the time period corresponds to the shooting time period of the moving image data;
executing, by the processor, image analysis on the moving image data;
generating, by the processor, image analysis result data based on the image analysis;
detecting, by the processor, a specific motion of a subject, included in the moving image data, based on the generated image analysis result data;
generating, by the processor, an interface including the moving image data and graphs of at least two pieces of data among the sensor data, the chronological data, or the image analysis result data;

generating, by the processor, a marking result bar with a mark on a time instance at which a frequency of the specific motion of the subject exceeds a threshold value; and marking, by the processor, a second time instance at which a value of the event satisfies a specific condition.

12. A non-transitory computer-readable medium having stored thereon computer-executable instructions which, when executed by a computer, cause the computer to execute operations, the operations comprising:

acquiring moving image data;

receiving sensor data associated with the moving image data;

and chronological data corresponding to a shooting time period of the moving image data, wherein
  the chronological data is data related to an event occurrence frequency data obtained based on an occurrence of an event in a time period prior to the shooting time period, and
  the time period corresponds to the shooting time period of the moving image data;

executing image analysis on the moving image data;

generating image analysis result data based on the image analysis;

detecting a specific motion of a subject, included in the moving image data, based on the generated image analysis result data;

generating an interface including the moving image data and graphs of at least two pieces of data among the sensor data, the chronological data, or the image analysis result data;

generating a marking result bar with a mark on a time instance at which a frequency of the specific motion of the subject exceeds a threshold value; and marking a second time instance at which a value of the event satisfies a specific condition.

* * * * *